United States Patent
Sato

(10) Patent No.: US 10,902,885 B2
(45) Date of Patent: Jan. 26, 2021

(54) DISK DEVICE WITH GASKET ALIGNED WITH COVER BURRS

(71) Applicants: Kabushiki Kaisha Toshiba, Tokyo (JP); Toshiba Electronic Devices & Storage Corporation, Tokyo (JP)

(72) Inventor: Yuki Sato, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/282,437

(22) Filed: Feb. 22, 2019

(65) Prior Publication Data
US 2020/0090707 A1    Mar. 19, 2020

(30) Foreign Application Priority Data
Sep. 19, 2018 (JP) .................... 2018-174651

(51) Int. Cl.
| | |
|---|---|
| G11B 33/14 | (2006.01) |
| G11B 33/02 | (2006.01) |
| G11B 25/04 | (2006.01) |

(52) U.S. Cl.
CPC .......... *G11B 33/027* (2013.01); *G11B 25/043* (2013.01); *G11B 33/148* (2013.01); *G11B 33/1446* (2013.01); *G11B 33/1466* (2013.01)

(58) Field of Classification Search
None
See application file for complete search history.

(56) References Cited

U.S. PATENT DOCUMENTS

| | | | | |
|---|---|---|---|---|
| 6,128,159 A | * | 10/2000 | Ino ...................... | G11B 25/043 360/97.16 |
| 9,779,779 B1 | | 10/2017 | Okamoto et al. | |
| 9,953,684 B2 | | 4/2018 | Albrecht et al. | |
| 2013/0194701 A1 | * | 8/2013 | Fukushima ........ | G11B 19/2009 360/99.08 |
| 2013/0222947 A1 | * | 8/2013 | Sugii et al. .......... | G11B 33/027 360/99.08 |

FOREIGN PATENT DOCUMENTS

| | | |
|---|---|---|
| CN | 1201237 A | 12/1998 |
| JP | H07-296550 A | 11/1995 |

* cited by examiner

*Primary Examiner* — Craig A. Renner
(74) *Attorney, Agent, or Firm* — White & Case LLP

(57) ABSTRACT

According to one embodiment, a disk device includes a housing including a base including a sidewall, and a first cover on a surface of the sidewall, and a discoidal recording medium in the housing. The first cover includes a first surface, a second surface on an opposite side to the first surface, and a side portion. The second surface includes a packing on a peripheral portion thereof. The side portion includes a burr on the second surface side and the packing is aligned to the burr.

14 Claims, 10 Drawing Sheets

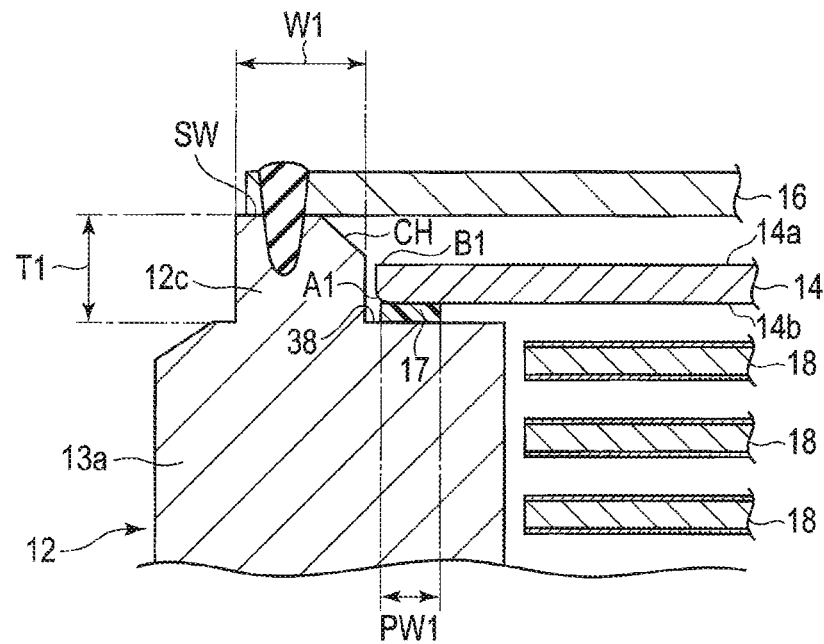
F I G. 11
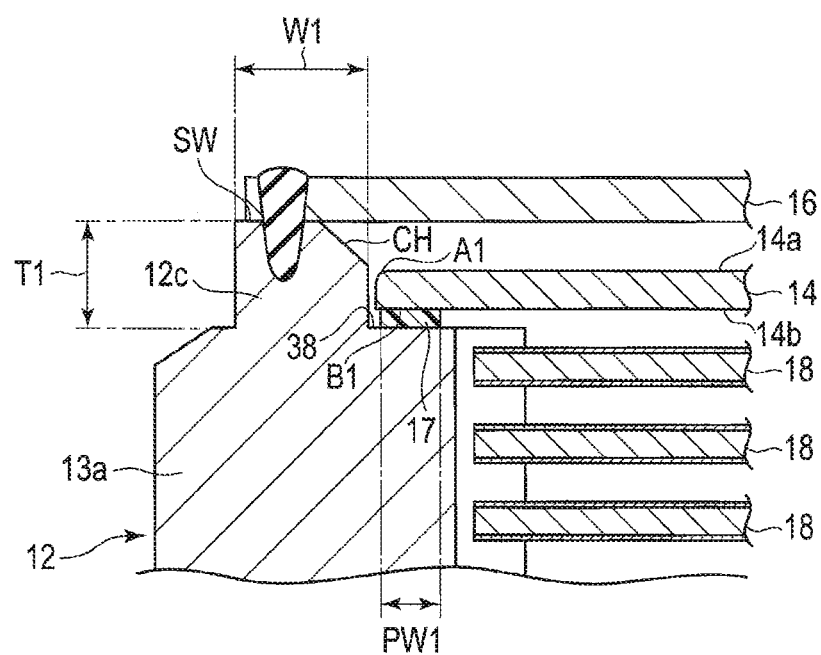
F I G. 12

DISK DEVICE WITH GASKET ALIGNED WITH COVER BURRS

CROSS-REFERENCE TO RELATED APPLICATIONS

This application is based upon and claims the benefit of priority from Japanese Patent Application No. 2018-174651, filed Sep. 19, 2018, the entire contents of which are incorporated herein by reference.

FIELD

Embodiments described herein relate generally to a disk device.

BACKGROUND

As a disk device, a magnetic disk drive comprises a housing including a base and a cover, and the housing accommodates therein a rotatable magnetic disk, an actuator supporting a magnetic head and the like. As a technique of improving the performance of the disk drive, a method of reducing rotational resistances of the magnetic disk and the magnetic head, by sealing low-density gas in the housing, has been proposed. In such a magnetic disk drive, the cover is attached to the base through, for example, packing or a gasket, to airtightly enclose the housing.

BRIEF DESCRIPTION OF THE DRAWINGS

FIG. 11 is a cross sectional view of the HDD taken along line A-A of FIG. 1.

FIG. 12 is a cross sectional view of the HDD taken along line B-B of FIG. 1.

DETAILED DESCRIPTION

Figure 1:
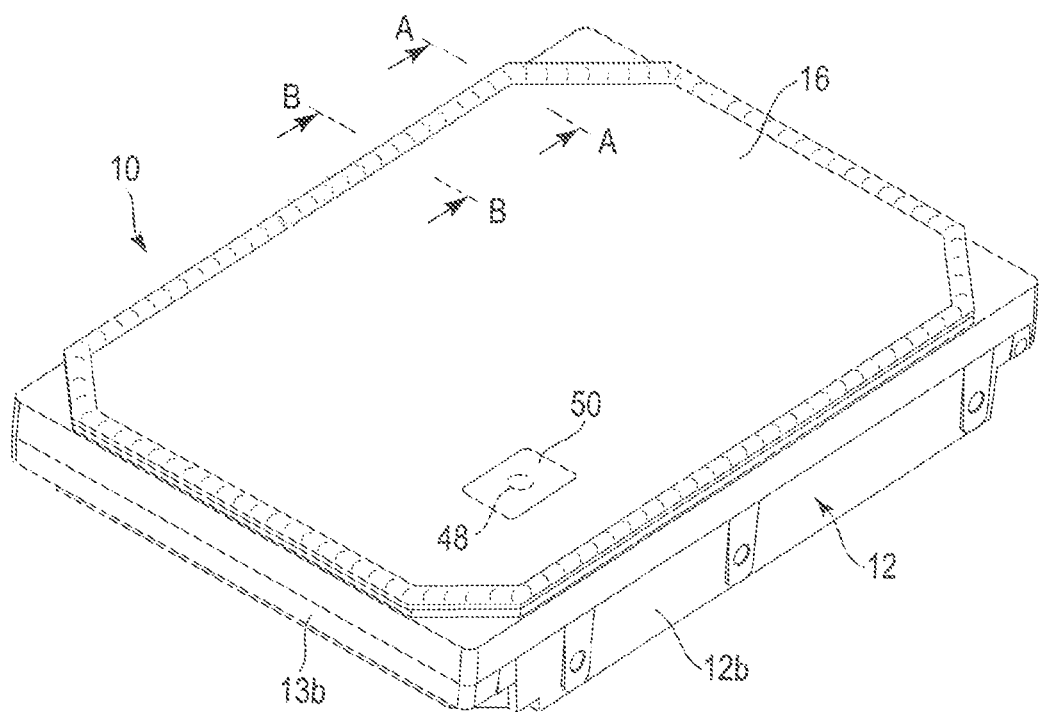
FIG. 1 is a perspective view showing a hard disk drive (HDD) according to a first embodiment.

Various embodiments will be described hereinafter with reference to the accompanying drawings. In general, according to one embodiment, a disk device comprises a housing comprising a base comprising a sidewall and a first cover on a surface of the sidewall; and a discoidal recording medium accommodated in the housing. The first cover comprises a first surface, a second surface on an opposite side to the first surface, and a side portion. The second surface comprises a packing on a peripheral portion thereof, and the side portion comprises a burr on the second surface side and the packing is aligned to the burr.

Note that what is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

As a disk device, a hard disk drive (HDD) according to the first embodiment will be described in detail. FIG. 1 is a perspective view showing the appearance of the HDD according to the embodiment, and FIGS. 2 and 3 each are an exploded perspective view of the HDD when decomposed.

Figure 2:
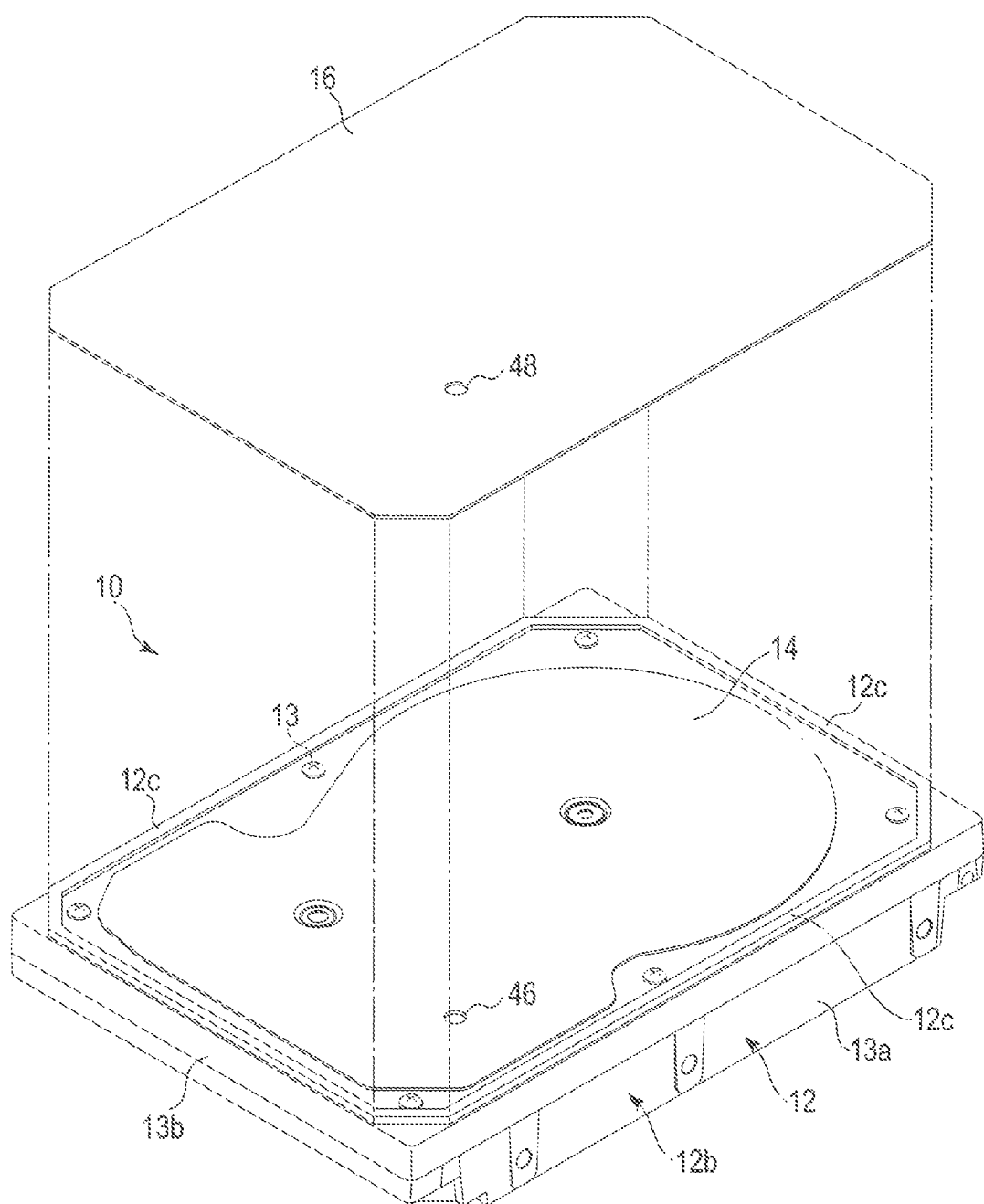
FIG. 2 is an exploded perspective view of the HDD while an outer cover thereof being removed.
Figure 3:
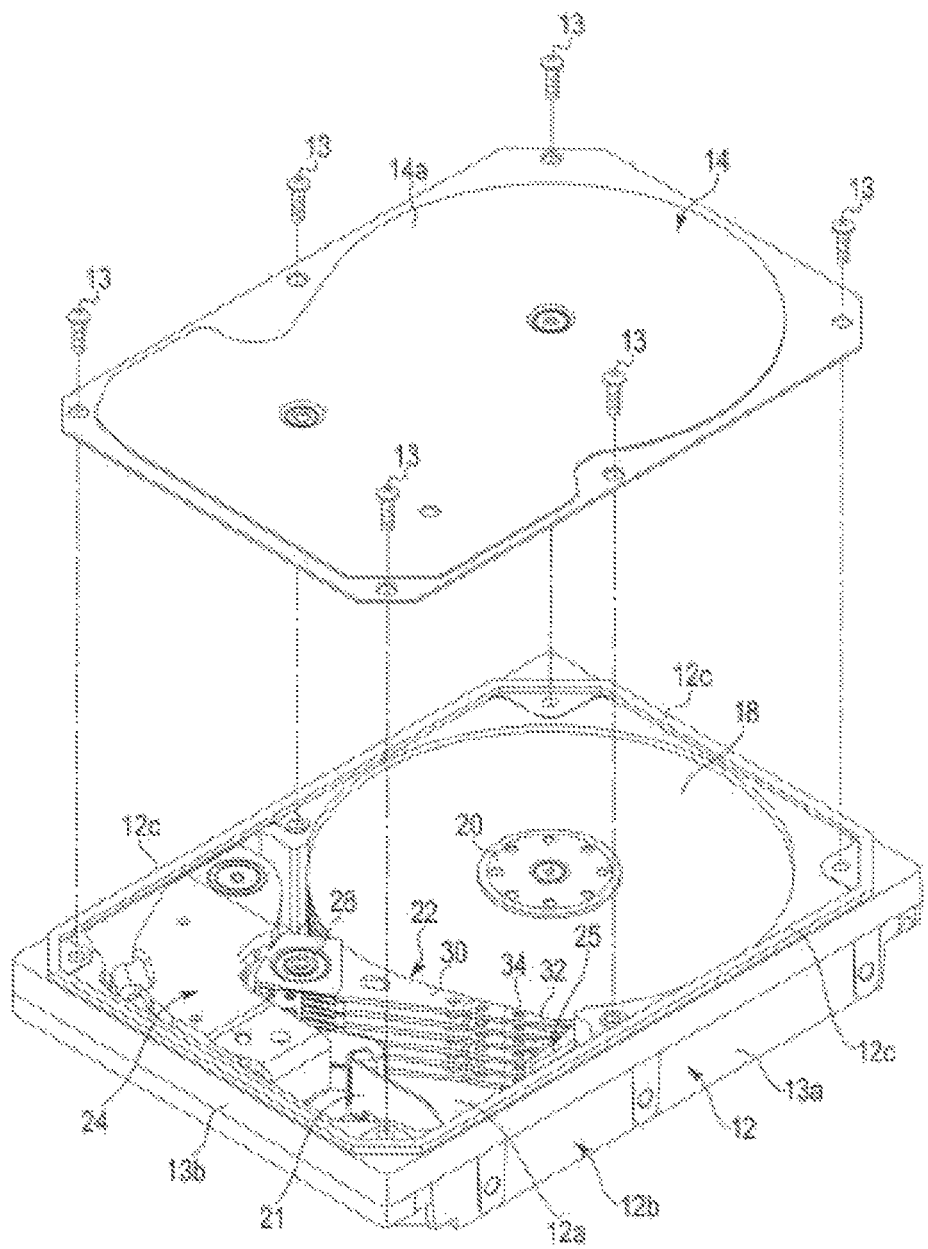
FIG. 3 is an exploded perspective view of the HDD while an inner cover thereof being removed.

As shown in FIGS. 1 to 3, the HDD comprises a flat and substantially rectangular parallelepiped housing 10. The housing 10 comprises a base 12 in the shape of a rectangular box whose upper surface is open, an inner cover (first cover) 14 which is secured to the base 12 by a plurality of screws 13 and closes an upper end opening of the base 12, and an outer cover (second cover) 16 which is disposed on the inner cover 14, and whose peripheral edge portion is welded to the base 12. The base 12 comprises a rectangular bottom wall 12a opposing the inner cover 14 with a gap therebetween, and sidewalls 12b standing along edges of the bottom wall 12a, which are formed integrally as one body from an aluminum alloy. The sidewalls 12b include a pair of long sidewalls 13a opposing each other and a pair of short sidewalls 13b opposing each other. An inner surface of one of the short sidewalls 13b and an inner side surface of about ⅔ region of each long sidewall 13a are formed into an arcuate shape curved along an outer circumferential edge of a magnetic disk 18, which will be described later. A substantially rectangular frame-shaped fixing rib 12c is provided on an upper end surface 38 of each sidewall 12b. The fixing rib 12c is formed integrally with the respective sidewall 12b as one body, thus constituting a part of the sidewall 12b. The fixing rib 12c will be described in detail later.

Figure 4:
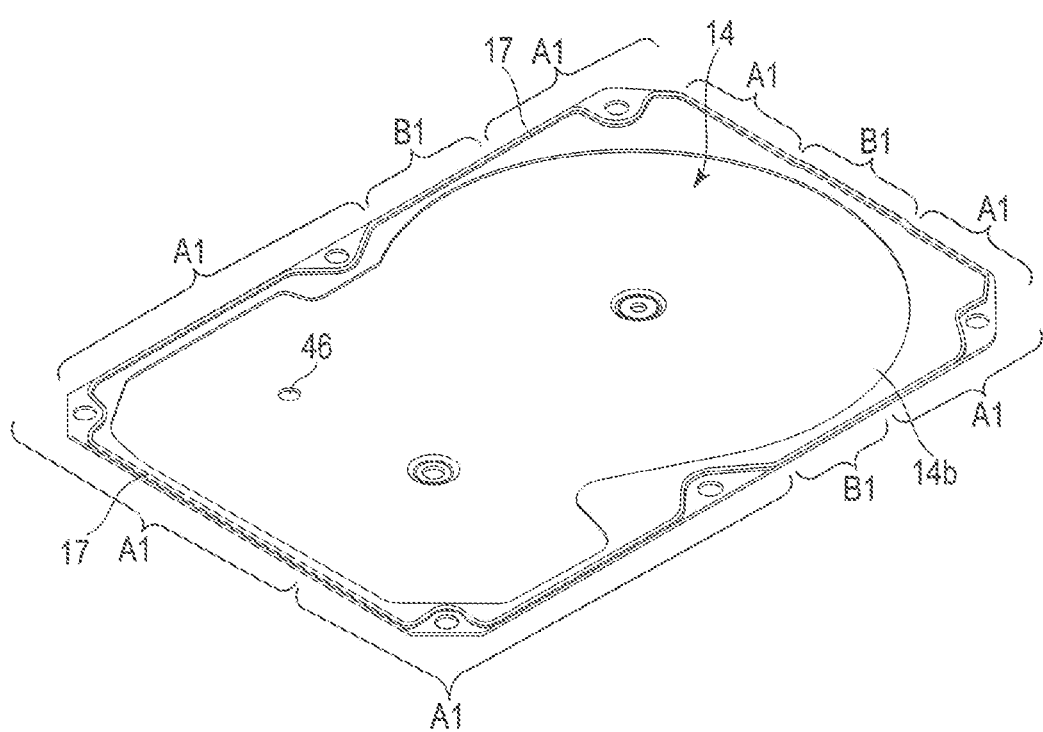
FIG. 4 is a perspective view showing an inner side of the inner cover.

The inner cover 14 is formed into a rectangular plate-shape from stainless steel, for example. The inner cover 14 has a shape and dimensions corresponding to those of the fixing rib 12c of the base 12. That is, the inner cover 14 has an outer circumferential shape corresponding to the inner circumferential shape of the fixing rib 12c and is formed to have outer dimensions slightly less than inner dimensions of the fixing rib 12c. The inner cover 14 comprises a first surface (outer surface) 14a, a second surface (inner surface) 14b on an opposite side, and a side portion. As shown in FIG. 4, a rectangular frame-shaped gasket (a sealing material or packing) 17 is provided on a circumferential portion of the inner surface 14b of the inner cover 14. The gasket 17 extends all along the outer circumferential edge of the inner surface 14b. The gasket 17 is formed by applying a sealing material, for example, UV-curing resin or the like by a predetermined width on the inner surface 14b of the inner cover 14, followed by curing.

As shown in FIGS. 2 and 3, the inner cover 14 is disposed on upper end surfaces (mounting surfaces) 38 of the sidewalls 12b of the base 12 and on an inner side of the fixing rib 12c. The circumferential portion of the inner cover 14 is placed on the upper end surface faces 38 via the gasket 17. A plurality of locations of the circumferential portion of the inner cover 14, that is, for example, four corner portions and a longitudinal central portion, are screwed to the upper end surface 38 of the sidewalls 12b with screws 13. Thus, the inner cover 14 airtightly closes the upper opening of the base 12. The side edges (side surfaces) of the inner cover 14 oppose the inner side surfaces of the fixing rib 12c with a slight gap therebetween.

The fixing rib 12c is formed to have a height greater than the thickness of the inner cover 14. As shown in FIG. 2, in the state where the inner cover 14 is attached to the base 12, the fixing rib 12c protrude up over the inner cover 14.

As shown in FIGS. 1 and 2, the outer cover 16 is formed into a rectangular plate shape from aluminum or aluminum alloy, for example. The outer cover 16 has an outer circumferential shape and dimensions substantially equal to the outer circumferential shape and outer dimensions of the fixing rib 12c. That is, the outer cover 16 is formed to be slightly greater in dimensions than the inner cover 14. The outer cover 16 is arranged on the upper end surface of the fixing rib 12c, to cover the inner cover 14. The peripheral portion of the outer cover 16 is welded to the fixing rib 12c all around thereof and fixed airtightly to the base 12.

In the inner cover 14 and the outer cover 16, vent holes 46 and 48 through which the interior of the housing 10 and the exterior of the housing 10 are communicated with each other are formed, respectively. The air in the housing 10 is exhausted through the vent holes 46 and 48, and further, through these vent holes 46 and 48, a low-density gas (inert gas) having a density lower than that of air, for example, a helium, is enclosed in the housing 10. Then, a sealant (a sealing body) 50 is attached to the outer surface of the outer cover 16 so as to close the vent hole 48.

As shown in FIG. 3, in the housing 10, a plurality of magnetic disks 18 as recording media, and a spindle motor 20 as a drive unit which supports and rotates the magnetic disks 18 are provided. The spindle motor 20 is arranged on the bottom wall 12a. Each magnetic disk 18 is formed so as to have a diameter of, for example, 95 mm and comprises a magnetic recording layer on the upper surface and/or lower surface. The magnetic disks 18 are engaged coaxially with a hub (not shown) of the spindle motor 20, clamped by a clamp spring, and thereby fixed to the hub. In this manner, the magnetic disks 18 are supported in parallel to the bottom wall 12a of the base 12. The magnetic disks 18 are rotated at a predetermined number of revolutions by the spindle motor 20.

As shown in FIG. 3, five magnetic disks 18, for example, are accommodated in the housing 10 in the present embodiment. The number of magnetic disks 18 is not limited to five, and can be increased or decreased. Further, a single magnetic disk 18 may be accommodated in the housing 10.

In the housing 10, a plurality of magnetic heads 32, which record and reproduce information on and from the magnetic disks 18, and a head actuator assembly 22, which supports the magnetic heads 32 such that they are movable with respect to the magnetic disks 18, are provided. Further, the housing 10 accommodates a voice coil motor (hereinafter referred to as VCM) 24 which rotates and positions the head actuator assembly 22, a ramp loading mechanism 25 which holds the magnetic heads 32 at an unloading position away from the magnetic disks 18 when the magnetic heads 32 are moved to the outermost circumference of the magnetic disks 18, and a board unit 21 on which electronic components including a conversion connector are mounted.

The head actuator assembly 22 includes an actuator block 22 in which a bearing unit 28 is built, a plurality of arms 30 extending from the actuator block, and a suspension 34 extending from each of the arms 30, and the magnetic head 32 is supported by the distal end portion of each of the suspensions 34. The head actuator assembly 22 is supported pivotably by a pivot disposed to stand on the bottom wall 12a via the bearing unit 28.

Onto the outer surface of the bottom wall 12a, a printed circuit board (not shown) is fixed by screws. A controller unit is formed on the printed circuit board and the controller controls the operation of the spindle motor 20, and also controls the operation of the VCM 24 and the magnetic heads 32 via the board unit 21.

Next, the structure of the inner cover 14, the packing 17 and the fixing rib 12c and the structure of a welding portion will be described in detail.

Figure 5:
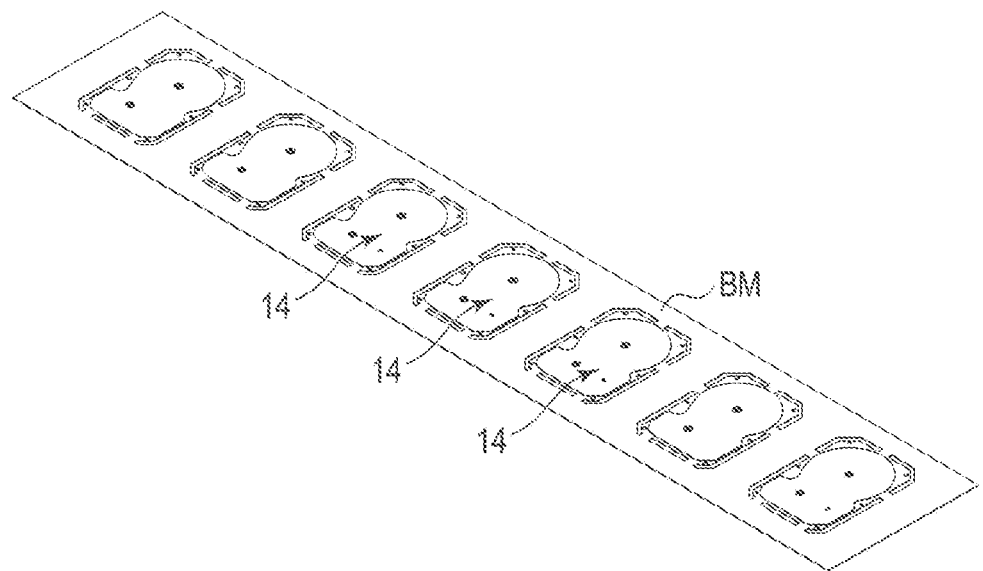
FIG. 5 is a perspective view of a cover base material, illustrating a step of a press working process of the inner cover.
Figure 6:
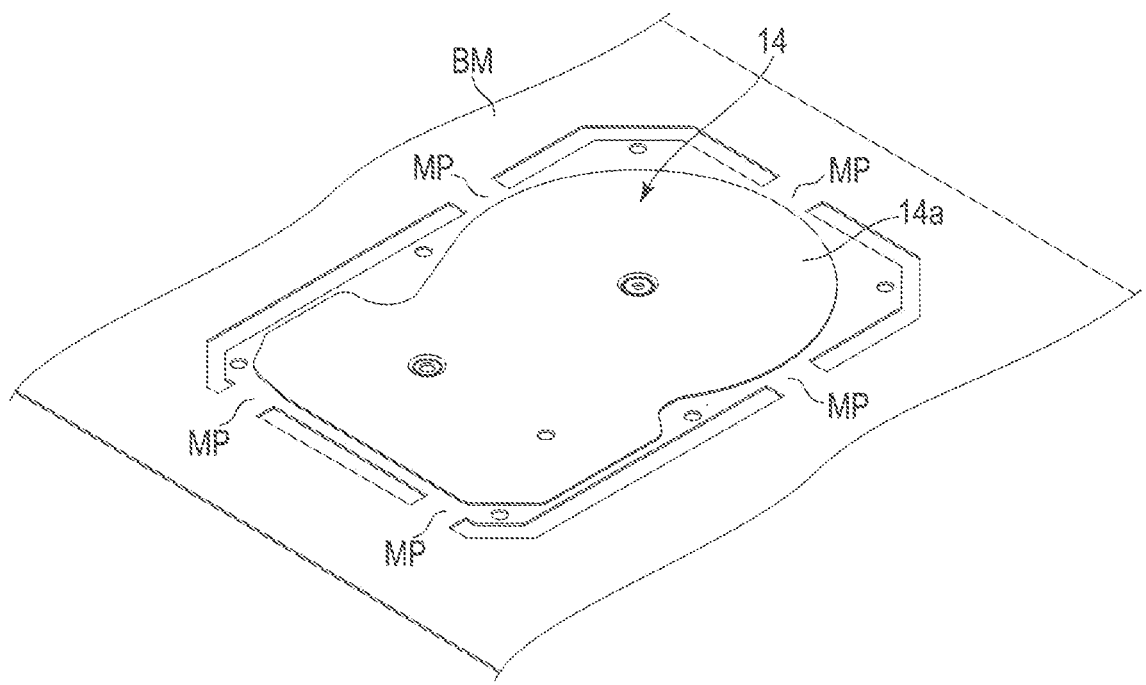
FIG. 6 is a partially enlarged perspective view of the cover base material.

FIG. 5 is a perspective view of a belt-shaped base material subjected to press working process of a plurality of inner covers in the manufacturing process, and FIG. 6 is a perspective view of the base material, containing an enlarged view of one of the inner covers.

As shown in FIGS. 5 and 6, the inner cover 14 is formed from a base material BM by subjecting it to press molding and stamping the surrounds thereof out. First, the periphery of the inner cover 14 are mostly stamped out, while maintaining matching points (connection portions) MP at a plurality of locations. For example, the connection portions MP are respectively formed at a central portion of one short side of the inner cover 14, substantially a central portion of each long side, and two locations of the other short side. More specifically, the connection portions MP are provided adjacent to the locations where the packing 17 and the outer circumferential edge of the magnetic disks are most close to each other. In more detail, the portions MP are mainly provided respectively near most narrow sections in the outer circumferential edge of the magnetic disk located at 3, 9 and 12 O'clock positions with respect to the center of the magnetic disk regarded as a clock.

Figure 7:
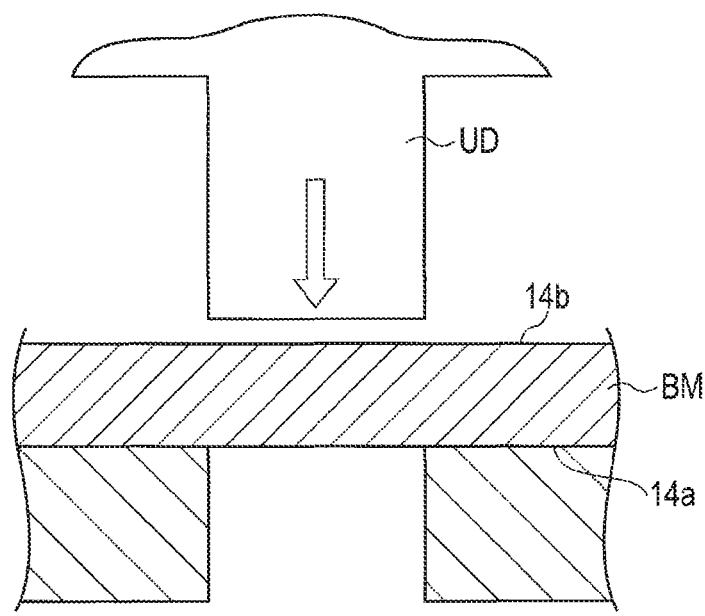
FIG. 7 is a diagram schematically showing the base material and metallic mold used for the press working process.
Figure 8:
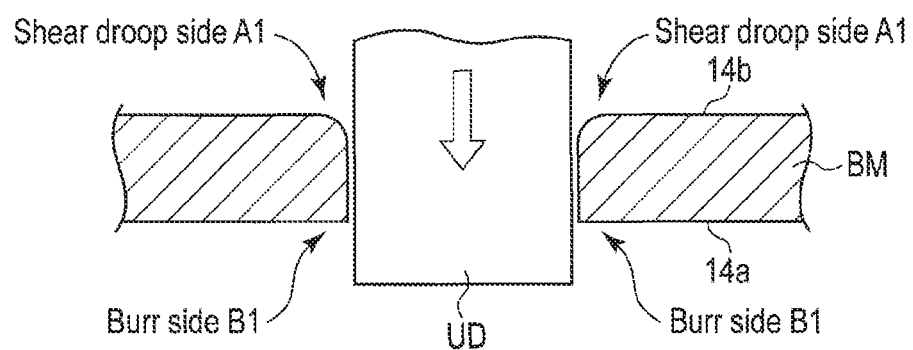
FIG. 8 is a cross sectional view showing a base material portion punched out in the press working process.

FIGS. 7 and 8 are cross sectional views schematically showing steps in the press working process. When stamping the periphery of the inner cover 14 out as shown in FIGS. 7 and 8, for example, a upper die (cope) UD is pressed from an inner surface 14b side of the inner cover 14 toward the outer surface 14a to partially stamp out the base material BM. In this case, as shown in FIG. 8, of the stamped out peripheral portion, an edge portion of the inner surface 14b, which is on a stamping start side, is curved slightly in an arc-manner, thereby forming a shear droop side A1. On the other hand, the edge portion of the outer surface 14a, which is on the stamping end side, becomes a substantially flat burr side (burr) B1 to the edge.

Subsequently, remaining connection portions MP are stamped out by press working process, and the inner cover 14 is cut down from the base material BM. Here, the connection portions MP are subjected to the press working in reverse, that is, from the outer surface 14a side of the inner cover 14 toward the inner surface 14b. Thus, in the periphery of the inner surface 14b of the inner cover 14, the region where the connection portions MP are stamped out is the burr side B1, and the other region of the periphery is the shear droop side A1.

In the press working process described above, the matching points (connection portions) MP used to stably hold the material in the progressive processing of the cover are provided at a plurality of locations (narrow regions) where the distance between the periphery of the magnetic disk 18 and the side edge of the inner cover 14 is short, and the press working process is carried out while switching the sag side and the burr side over. In this manner, an additional process such as shaving is no longer required, and therefore, the increase in the number of processing steps, positioning error in the pressing process and scratching of the cover with the scrap can be avoided. Thus, only with an ordinary progressing process, the shape and configuration of the inner cover can be realized, making it possible to form the inner cover easily at low cost.

Note that the connection portions MP may be arranged in not only the sections where the distance between the magnetic disk and the side edge of the inner cover is short, but also positioning locations for fitting the base and the inner cover together.

Figure 9:
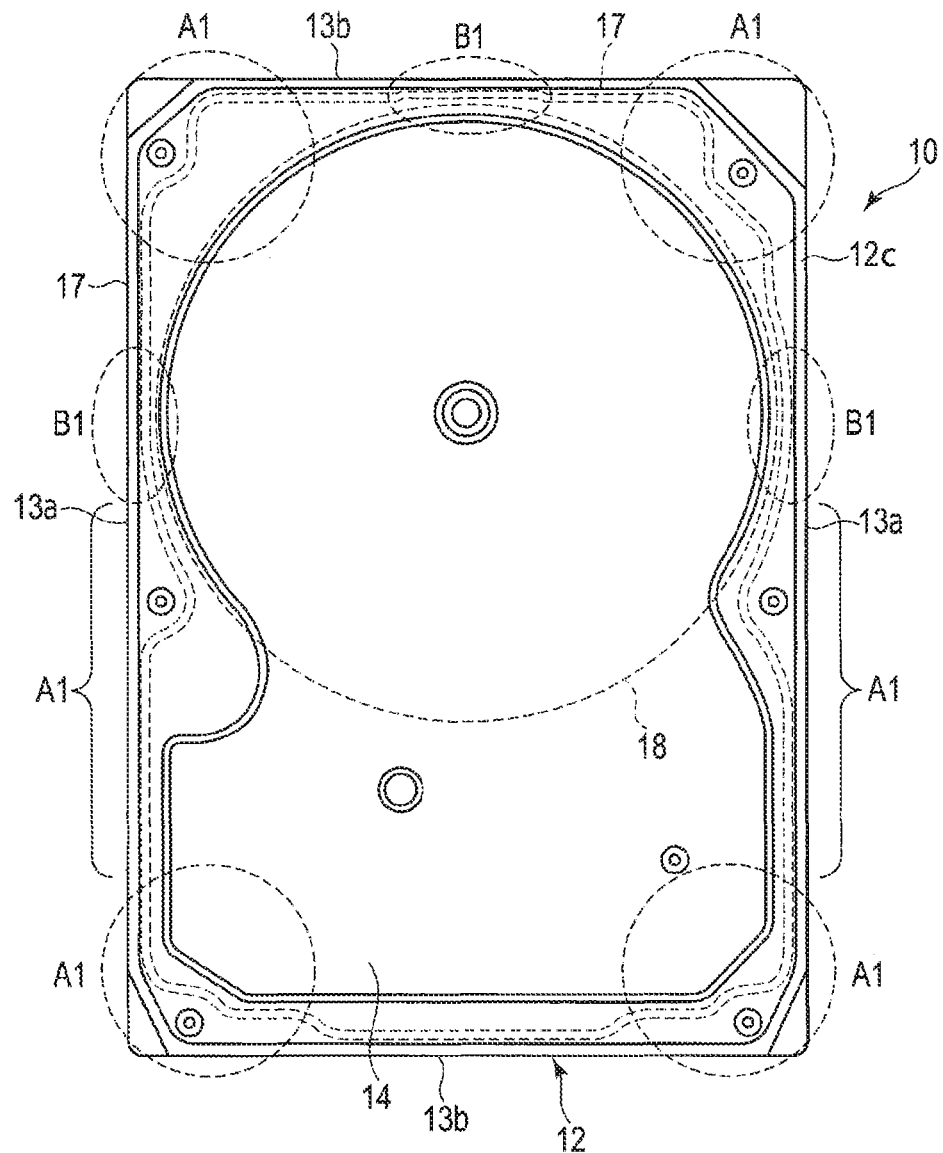
FIG. 9 is a plan view showing the inner cover and a base.

FIG. 9 is a plan view showing the inner cover 14 and the base. As shown in the figure, the regions in the periphery of the inner surface 14b of the inner cover 14, where the width of the mount surface 38 of the sidewalls 12b is the least, namely, the central portion of one short side wall 13b, the regions of the long side walls 13a, which passes the center of the magnetic disk 18 and crosses a straight line parallel to the short side wall 13b, are formed on the burr side B1, and the other regions are formed on the sag side (sag) A1. In particular, in the periphery of the inner surface 14b of the inner cover 14, the four corner portions as positioning reference of the inner cover 14 with respect to the fixing rib 12c are all on the sag side A1.

Figure 10A:
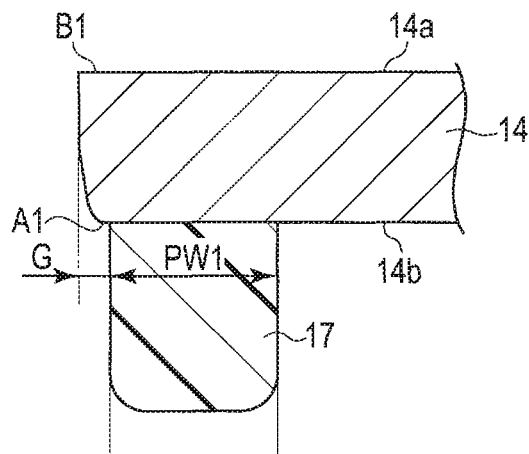
FIG. 10A is a cross sectional view of a peripheral portion of the inner cover, and the gasket.
Figure 10B:
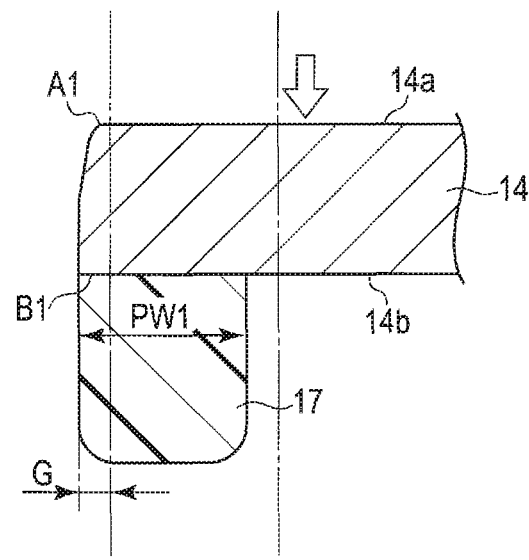
FIG. 10B is another cross sectional view of the peripheral portion of the inner cover and the gasket.
Figure 10C:
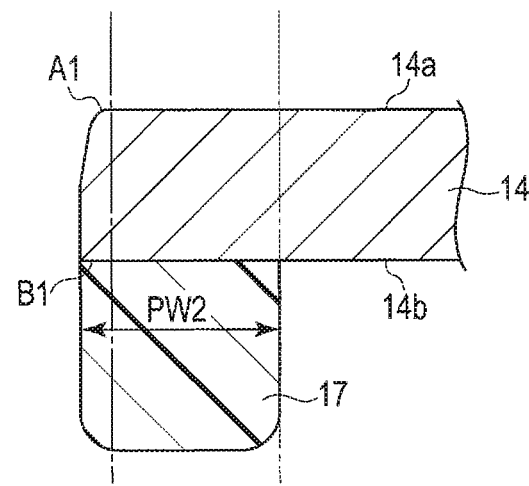
FIG. 10C is another cross sectional view of the peripheral portion of the inner cover and the gasket.

FIGS. 10A, 10B and 10C are cross sectional views each schematically showing the circumferential portion of the inner cover and the packing applied on the circumferential portion to be formed. As shown in FIG. 10A, in a sag side A1 in the periphery of the inner surface 14b of the inner cover 14, the packing 17 is provided in a flat position spaced apart from the side edge by only a gap G (for example, 0.12 to 0.15 mm) so as to avoid the curved portion (sheer droop). On the other hand, as shown in FIG. 10B, the burr side B1 of the inner surface 14b is substantially flat to the side edge, and therefore the packing 17 is formed near the side edge, for example, in a position aligned to be substantially flush with the side edge and aligned to the burr side B1. That is, when a width PW1 of the packing 17 is the same, the packing 17 can be disposed in a position shifted to the side edge side by the gap G in the burr side B1 compared to the case of the sag side A1.

Or as shown in FIG. 10C, when the set position of the inner periphery of the packing 17 is the same, the packing 17 can be provided in a position aligned to be substantially flush with the side edge in the burr side B1 of the inner side surface 14b. With this structure, the packing can be formed to have a width PW2, which is greater by the gap G than the width PW1 of the packing 17 provided in the sag side A1.

As shown in FIGS. 4 and 9, in this embodiment, the packing 17 is disposed along the peripheral portion of the inner surface 14b of the inner cover 14, and the packing 17 is formed to have a fixed width PW1 all along the entire circumference. In the peripheral portion of the inner surface 14b of the inner cover 14, the packing 17 is shifted to the position substantially flush with the side edge of the inner cover 14 in each region on the burr side B1, that is, shifted outwards by the gap G.

Moreover, in the four corner portions of the inner cover 14, the peripheral portion of the inner surface 14b is formed as the sag side A1, and the packing 17 is disposed in the position shifted inwards from the end edge of the inner cover 14 by only the gap G while avoiding the sheer droop.

As described above, the packing 17 can be disposed to be shifted to near the side edge of the inner cover 14 in the burr side B1. Therefore, even if the width PW1 of the packing 17 is set identical to the packing width of the other regions, the packing 17 is never brought into contact with the periphery of the magnetic disk 18. Thus, the width PW1 can be fixed over the entire circumference of the packing 17.

FIG. 11 is a cross sectional view of a side edge portion of the HDD taken along line A-A of FIG. 1, which includes a region on the sag side A1 of the inner cover 14. FIG. 12 is a cross sectional view of a side edge of the HDD taken along line B-B of FIG. 1, which includes a region on the burr side B1 of the inner cover 14.

As shown in FIGS. 3 and 11, the fixing rib 12c provided on the upper end surface (mount surface) 38 of the sidewall 12b has a height T1 and the width W1, which is less than the width of the sidewall 12b. The fixing rib 12c is disposed to be shifted to an outer edge side of the upper end surface 38, and with this structure, the mount surface 38 is provided on an inner side of the fixing rib 12c. The fixing rib 12c comprises a flat upper end surface (welding face) SW, an inner side surface extending substantially perpendicular to the mount surface 38 and an inclined surface (C surface) CH formed between the upper end surface SW and the inner side surface.

The inner cover 14 is formed on the base 12 with the inner surface 14b side thereof opposing the magnetic disk 18. The inner cover 14 is disposed on an inner side of the fixing rib 12c. During this operation, the inner cover 14 is disposed in a predetermined position on the inner side of the fixing rib 12c, for example, while utilizing the four corner portions of the inner cover 14 as reference for fitting together and positioning with respect to the fixing rib 12c. Thus, as shown in FIG. 11, the inner surface-side edge portion of the inner cover 14 is placed on the mount surface 38 of the sidewall 12b via the packing 17. In the position shown in FIG. 11, the mount surface 38 is formed to have a sufficiently great width, and therefore the packing 17 provided in the sag side A1 is tightly attached to the mount surface 38 in its entire width.

As shown in FIG. 12, in the region where the distance between the inner surface of the fixing rib 12c and the outer circumference edge of the magnetic disk 18 is short, the width of the mount surface 38 of the sidewall 12b is also small. In this region, the side edge portion of the inner surface 14b of the inner cover 14 is the burr side B1, and the packing 17 is disposed to be shifted to immediately near to the side edge of the inner surface 14b or outwards to a position flush therewith. Therefore, even though the width of the mount surface 38 is small, the packing 17 is disposed to be tightly attached to the mount surface 38 over its entire width. That is, the packing 17 is disposed within the width of the mount surface 38 without protruding to the outer circumferential side of the magnetic disk 18.

As shown in FIG. 2, the peripheral portion of the inner cover 14 is screwed by a plurality of locations to the mount surface 38 of the sidewall 12b with the screws 13. Thus, the circumferential portion of the inner cover 14 is tightly attached to the mount surface 38 via the packing 17 over the entire circumference to exhibits high airtightness.

As shown in FIGS. 1, 11 and 12, the peripheral portion of the outer cover 16 is placed on the upper end surface SW of the fixing rib 12c and is welded to the fixing rib 12c by, for example, laser welding. Thus, the outer cover 16 airtightly closes the upper opening of the housing 10 and maintains the inside of the housing 10 in airtight state.

With the inner cover and HDD according to the first embodiment configured as described above, the packing applied surface (inner surface of the cover) of the outer end of the cover, which is the positioning location for the inner cover 14 and the base 12 to fit with each other is the sag side, whereas the packing applied surface of the other locations, for example, the locations (narrow regions) where the distance between the outer circumferential edge of the magnetic disk 18 and the outer end of the inner cover is short or at minimum is the burr side. Therefore, during the assembling of the cover 14, the inner cover 14 and the base 12 can be fit and positioned with each other while suppressing scratching the fixing rib 12c, or the upper end surface SW and the C surface CH, and the sheer droop on the outer end of the inner cover can be eliminated. Thus, the packing 17 can be applied on a further outer end side of the inner cover as compared to the conventional technique.

In this manner, even when expanding the diameter of the magnetic disk along with the increase in storage capacity, it is still possible to apply packing to a further end edge side of the inner cover. Thus, a desired packing width can be secured, thereby making it possible to airtightly attach the inner cover to the base.

Further, as described above, a desired width of the packing can be secured even in locations (narrow regions) where the distance between the outer circumference edge of the magnetic disk 18 and the outer end of the inner cover is short or at minimum, and therefore the packing can be formed to have a fixed width over the entire circumference. Thus, it is possible to apply and form the packing easily without increasing the risk of leaking. That is, it is technically difficult to apply the packing to have different widths from one location to another, accordingly it becomes costly. On the other hand, according to this embodiment, the width of the packing 17 is fixed over the entire circumference, and therefore the packing can be applied and formed easily at low cost.

According to this embodiment, a cover with an improved airtightness and a disk device comprising the case can be obtained.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the peripheral portion of the inner cover (the packing applied surface), the corner portions, which are the positioning locations, may be set as the sag side, and the other regions may be set as the burr side.

Figure 13:
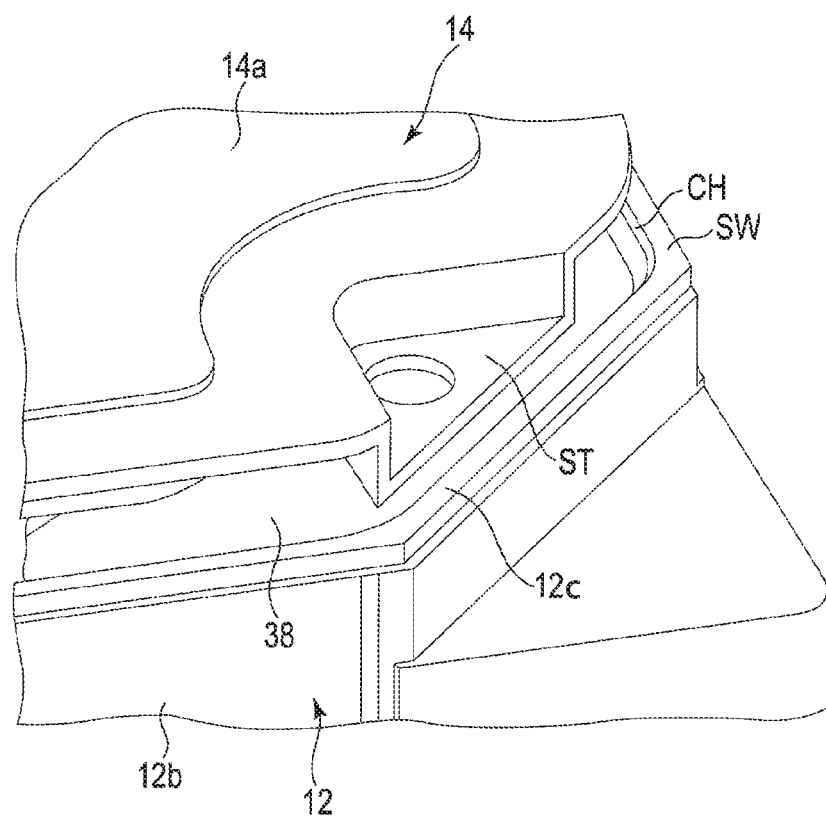
FIG. 13 is a perspective view showing a part of an inner cover according to a modified example.

As shown in FIG. 13, in the positioning locations for the inner cover 14 and the base 12 to fit in together, for example, in the corner portions of the inner cover, the stepped section ST having such a height to fit with the fixing rib 12c of the base 12 or the mount surface 38 may be provided in the outer end portion of the inner cover 14. The stepped section ST is formed by recessing from the inner surface 14b of the inner cover 14 to the base 12 side. The end edge of the stepped section ST also forms the sag side. In this case, the sag side is brought into contact with the fixing rib 12c prior to the burr side while assembling the inner cover, and thus it is possible to suppress the scratching of the fixing rib.

For example, the materials, shapes and sizes of elements constituting the head unit can be changed as needed. In the magnetic disk device, the number of magnetic disks and magnetic heads can be increased as needed. The size of the magnetic disks can be selected in various ways.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a housing comprising a base comprising a sidewall and a first cover on a surface of the sidewall; and
   a discoidal recording medium accommodated in the housing,
   wherein
   the housing seals a gas having a density lower than a density of air,
   the first cover comprises a first surface, a second surface on an opposite side to the first surface, and a side portion, the second surface comprises a packing on a peripheral portion thereof, the packing is frame-shaped with a fixed width, and
   the side portion comprises a burr on the second surface side and the packing is aligned to the burr.

2. The disk device of claim 1, wherein
   the burr is provided in a first region where a gap between the discoidal recording medium and the first cover is at minimum.

3. The disk device of claim 2, wherein
   the side portion of the first cover comprises a sag on the second surface side and the sag is provided in a second region where a gap between the discoidal recording medium and the first cover is larger than the gap in the first region.

4. The disk device of claim 1, wherein
   the side portion of the first cover comprises a corner portion with a stepped section.

5. The disk device of claim 1, wherein
   the side portion of the first cover comprises a corner portion with a sag on the second surface side.

6. The device of claim 1, wherein
   the base comprises a rib provided on the surface of the sidewall, the rib comprising an inner side surface opposing the side portion of the first cover, and
   the housing comprises a second cover provided on the rib.

7. The disk device of claim 1, wherein
   the burr is provided in each of a plurality of regions where a gap between the discoidal recording medium and the first cover is at minimum.

8. A disk device comprising:
   a housing comprising a base comprising a sidewall and a first cover on a surface of the sidewall; and a discoidal recording medium accommodated in the housing, wherein the first cover comprises a first surface, a second surface on an opposite side to the first surface, and a side portion, the second surface comprises a packing on a peripheral portion thereof, the side portion comprises a burr on the second surface side and the packing is aligned to the burr, the base comprises a rib provided on the surface of the sidewall, the rib comprising an inner side surface opposing the side portion of the first cover, and the housing comprises a second cover provided on the rib.

9. A disk device comprising:

a housing comprising a base comprising a sidewall and a first cover on a surface of the sidewall; and a discoidal recording medium accommodated in the housing, wherein the housing seals a gas having a density lower than a density of air, the first cover comprises a first surface, a second surface on an opposite side to the first surface, and a side portion, the second surface comprises a packing on a peripheral portion thereof, the packing is frame-shaped with a fixed width, and the side portion comprises a burr on the second surface side and the burr is provided in a first region where a gap between the discoidal recording medium and the first cover is at minimum.

10. The disk device of claim 9, wherein the side portion of the first cover comprises a sag on the second surface side and the sag is provided in a second region where a gap between the discoidal recording medium and the first cover is larger than the gap in the first region.

11. The disk device of claim 9, wherein the side portion of the first cover comprises a corner portion with a stepped section.

12. The disk device of claim 9, wherein the side portion of the first cover comprises a corner portion with a sag on the second surface side.

13. The disk device of claim 9, wherein the burr is provided in each of a plurality of first regions where a gap between the discoidal recording medium and the first cover is at minimum.

14. The disk device of claim 9, wherein the base comprises a rib provided on the surface of the sidewall, the rib comprising an inner side surface opposing the side portion of the first cover, and the housing comprises a second cover provided on the rib.

\* \* \* \* \*